117247

Plate A.

Witnesses:
Chs H Ladd
Emil Heusner

Inventor:
Henry Bessemer
by Z S Durfee his atty

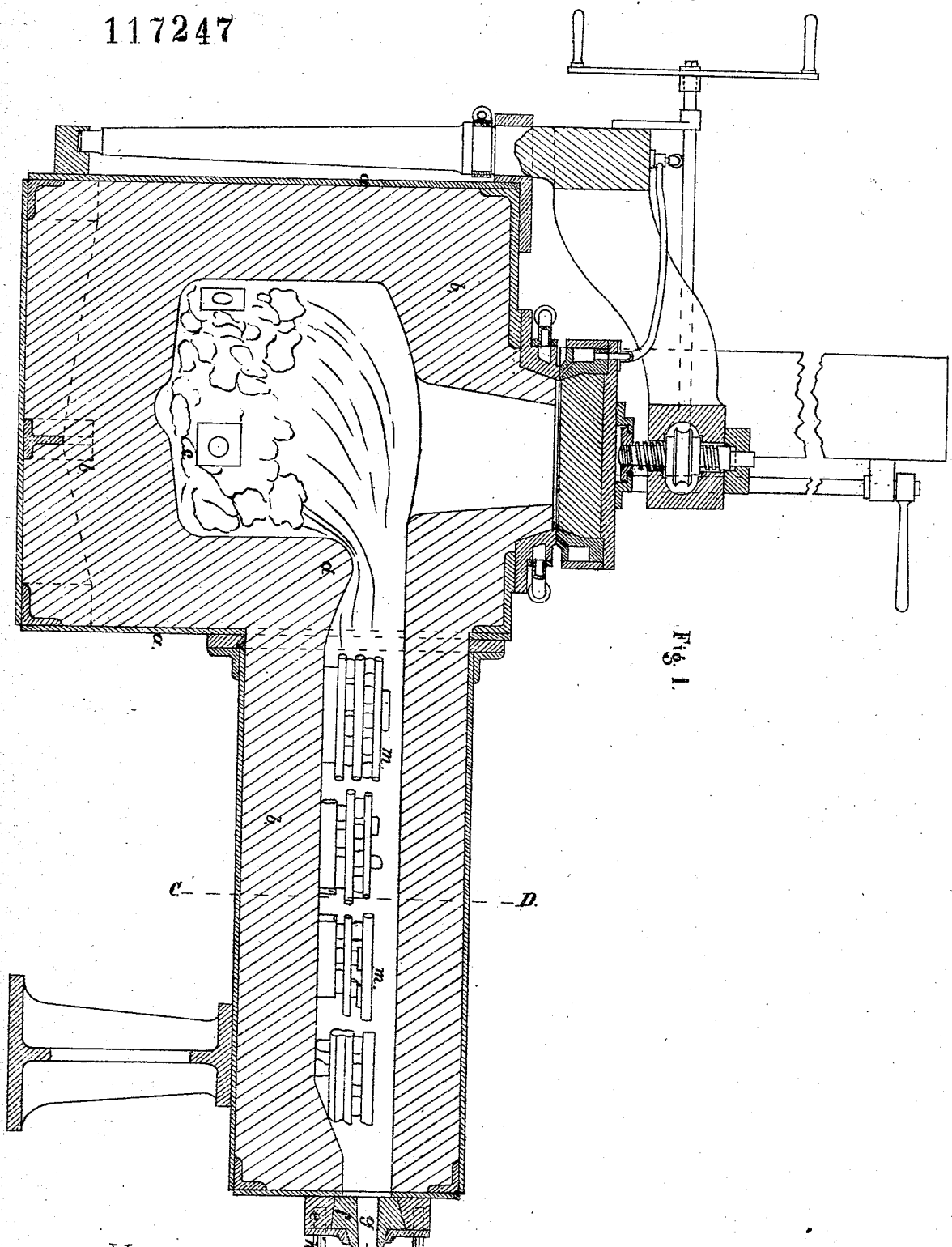

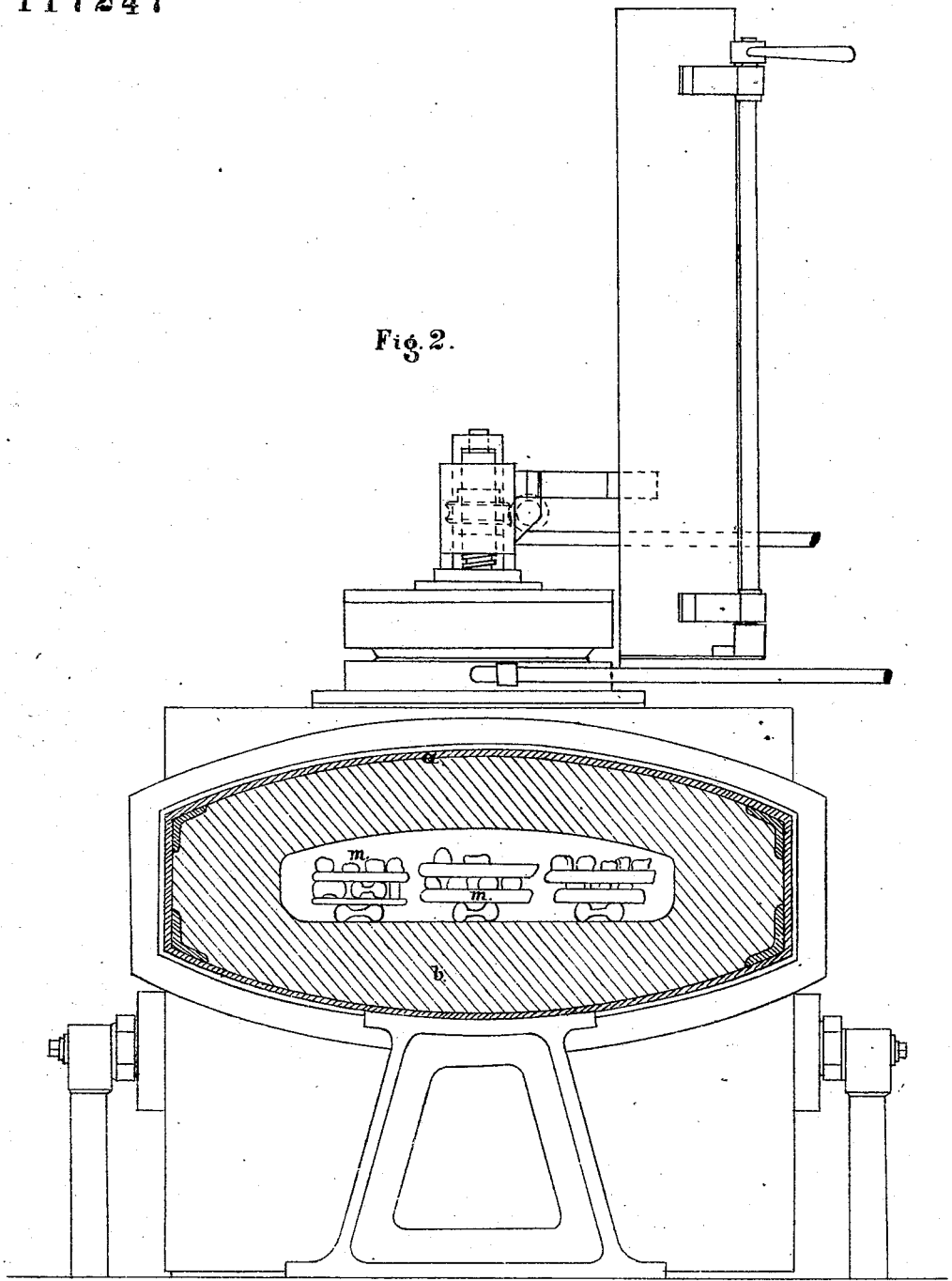

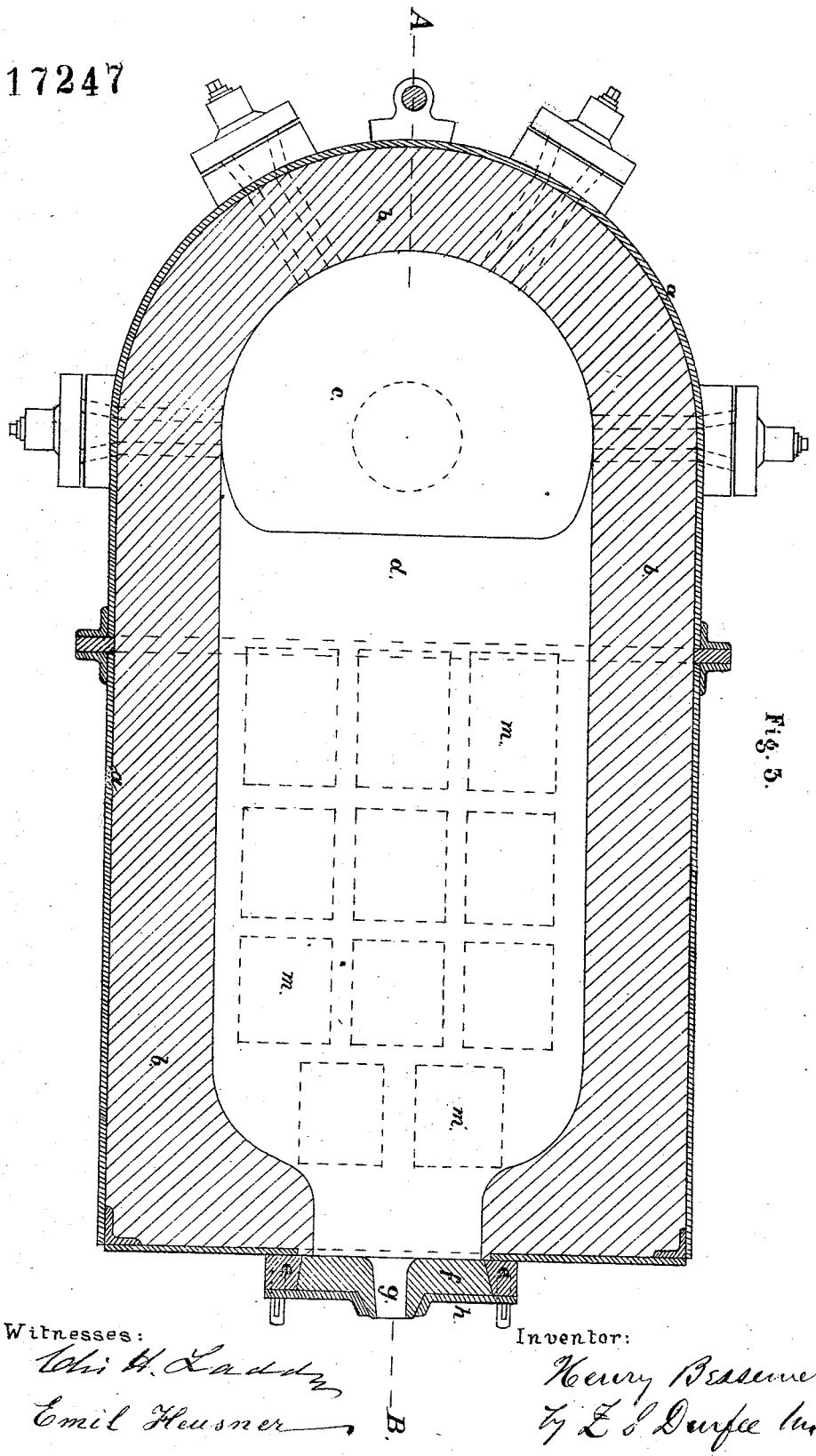

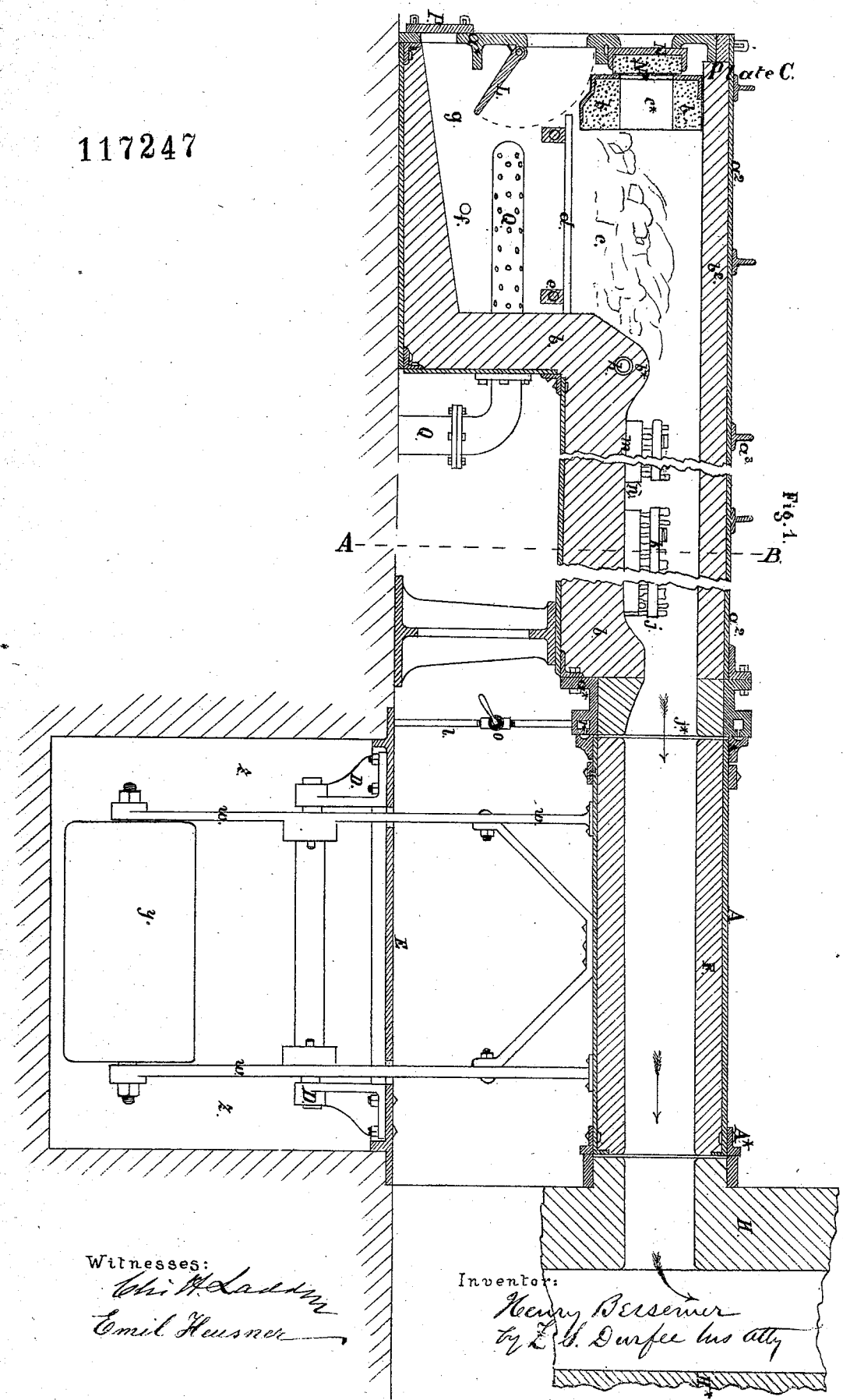

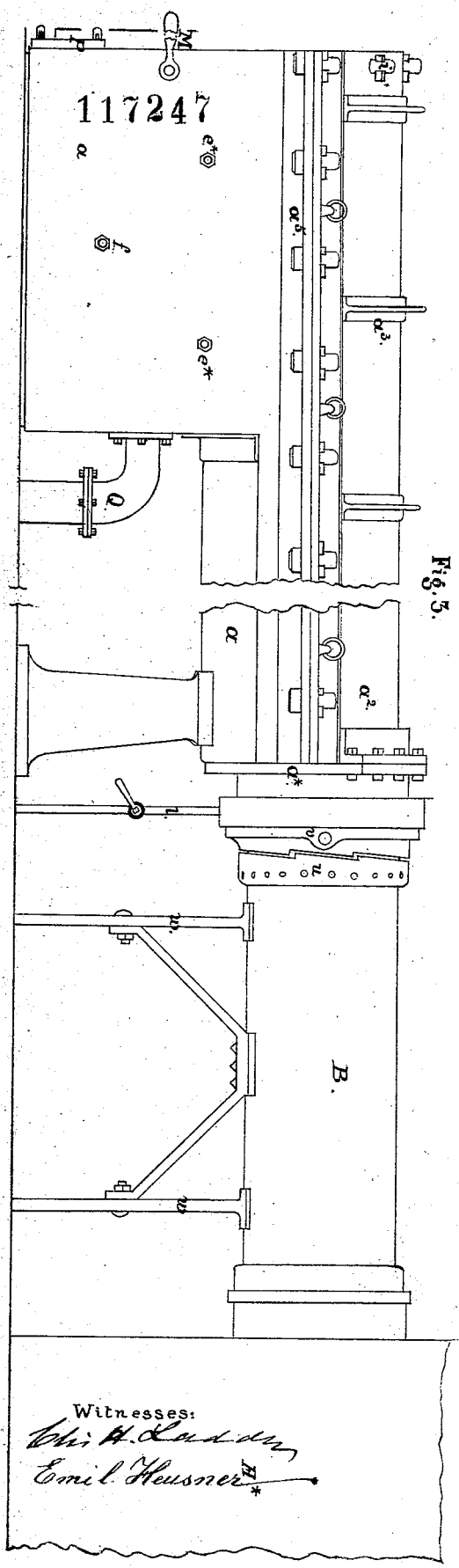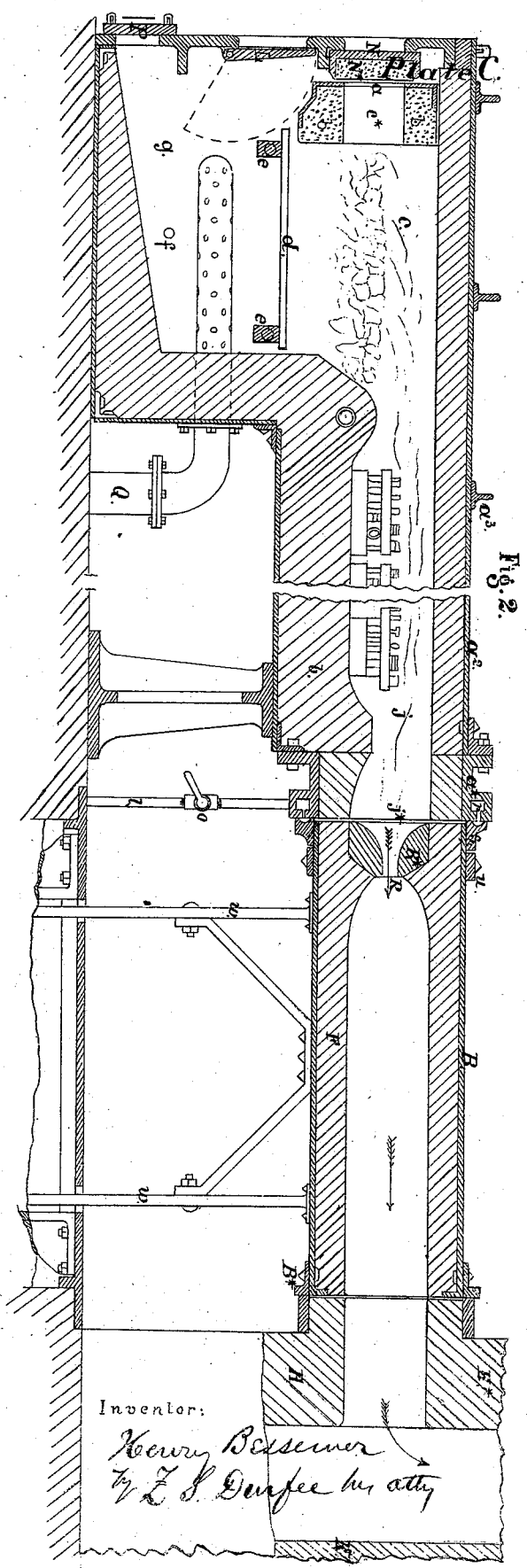

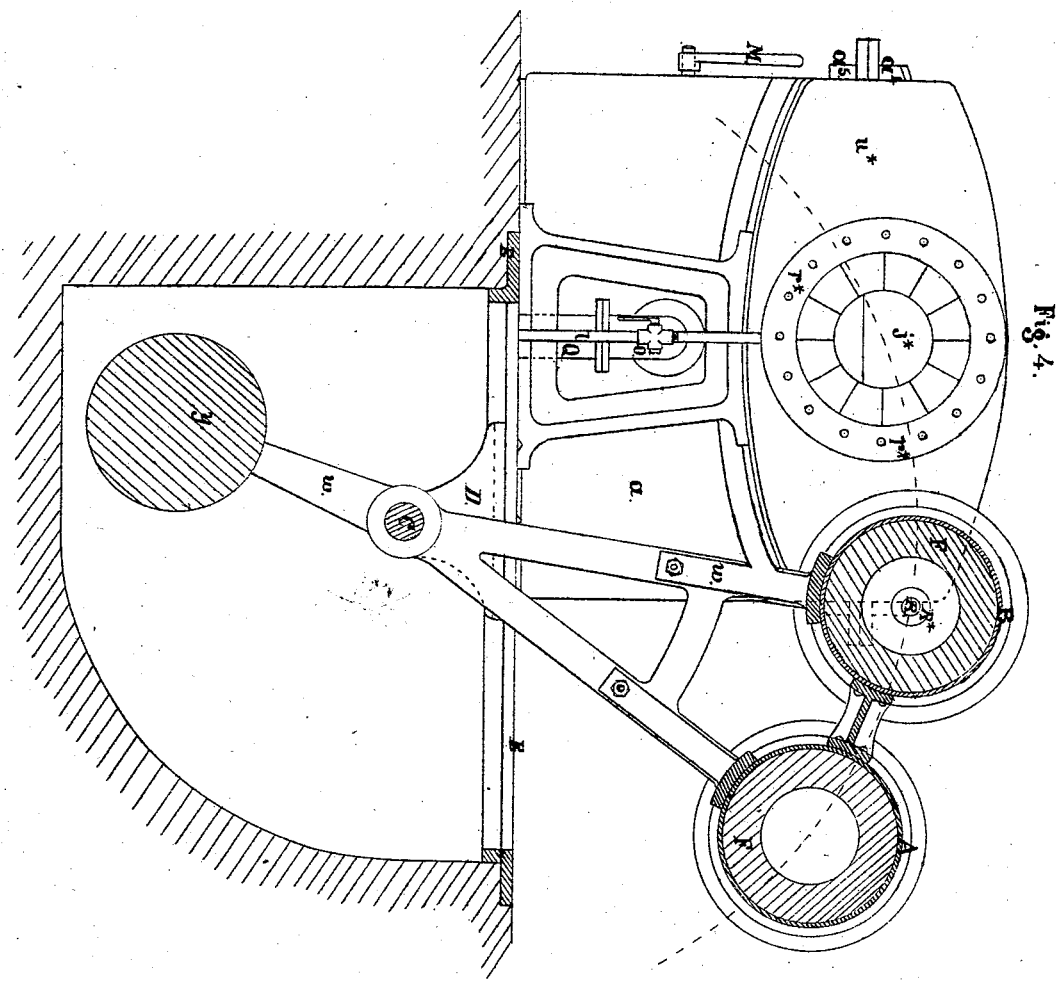

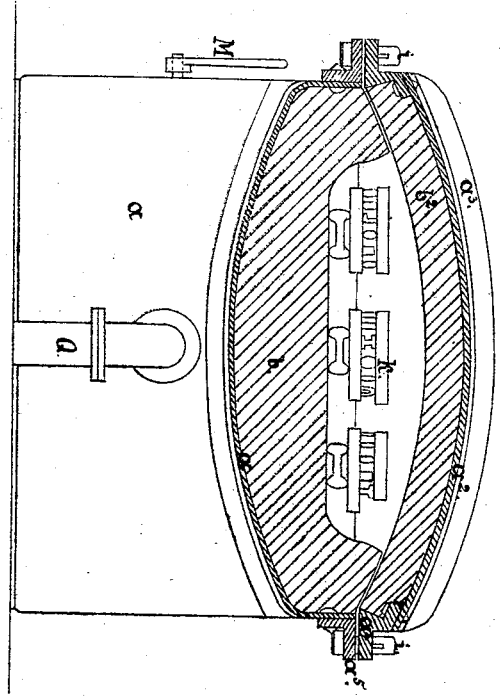
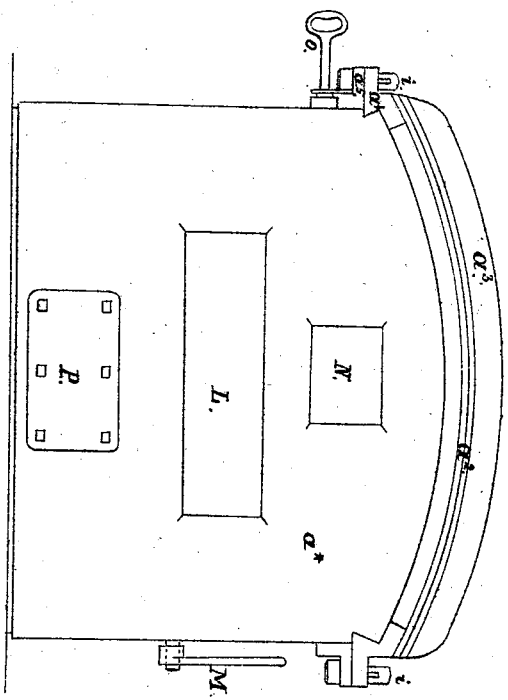

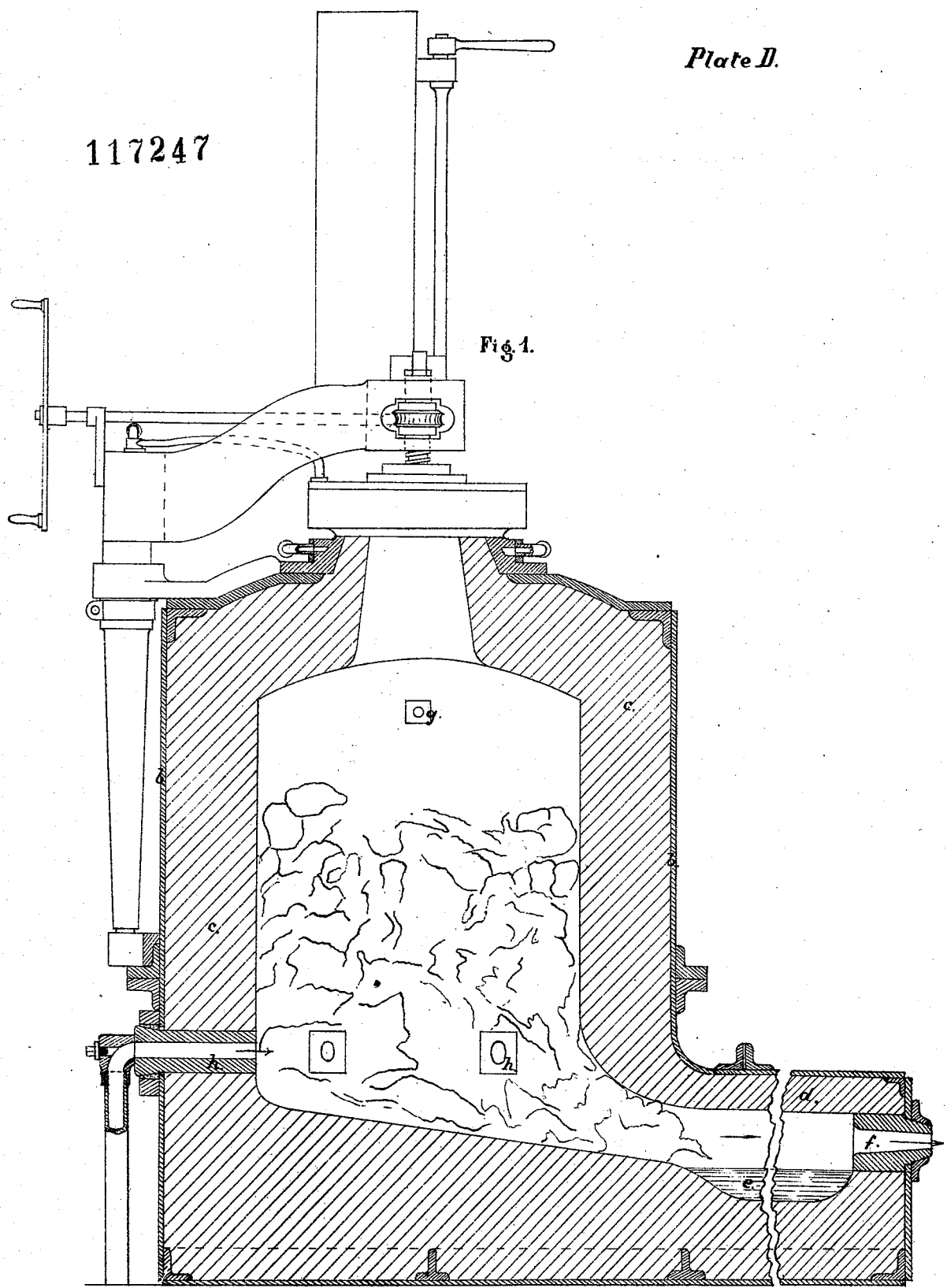

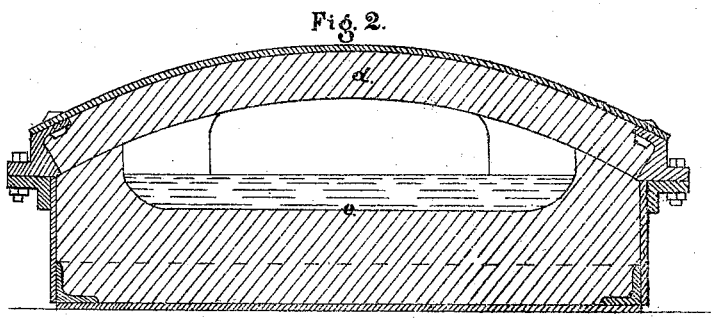
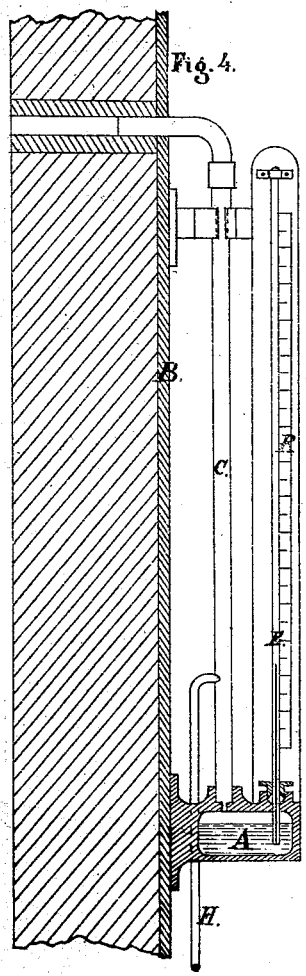
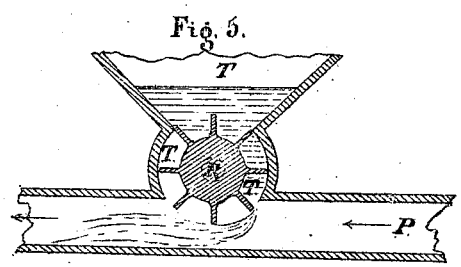
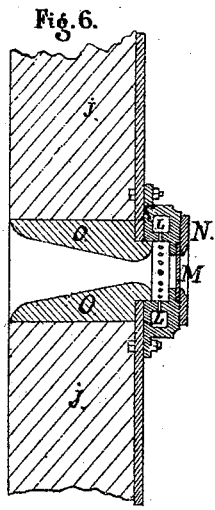
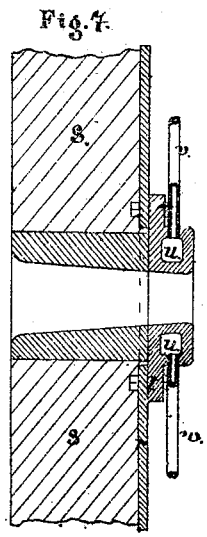

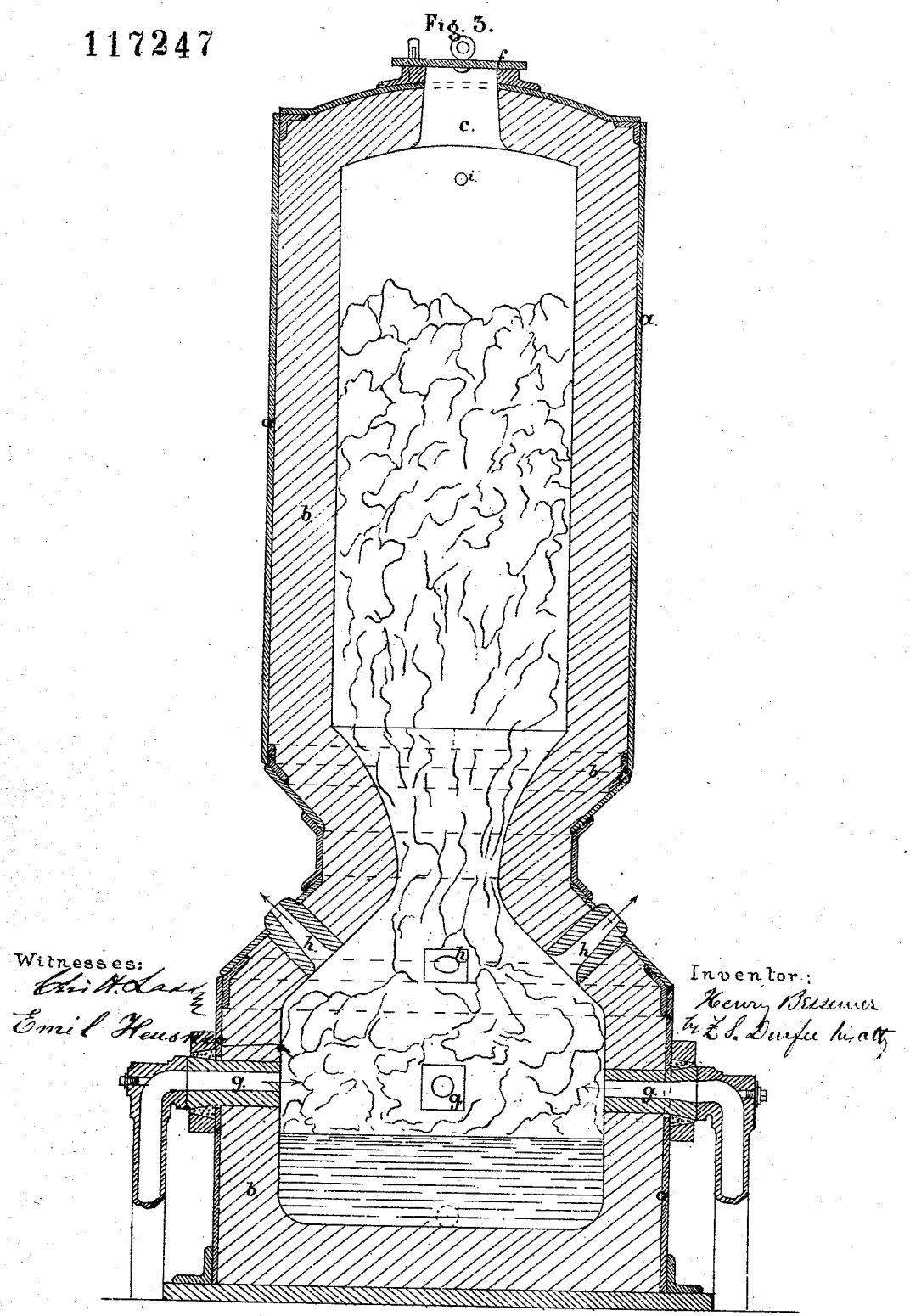

117,247

UNITED STATES PATENT OFFICE.

HENRY BESSEMER, OF LONDON, ENGLAND.

IMPROVEMENT IN FURNACES FOR THE MANUFACTURE OF MALLEABLE IRON AND STEEL.

Specification forming part of Letters Patent No. 117,247, dated July 25, 1871.

*To all whom it may concern:*

Be it known that I, HENRY BESSEMER, of Queen Street Place, Cannon street, in the city of London, a subject of the Queen of Great Britain, have invented or discovered new and useful improvements in the manufacture of malleable iron and steel and in furnaces and apparatus employed for their fusion and treatment; and I, the said HENRY BESSEMER, do hereby declare the nature of said invention, and in what manner the same is to be performed, to be particularly described and ascertained in and by the following statement thereof—that is to say:

These improvements relate to the fusion of malleable iron and steel and other carburets of iron in furnaces in which the gaseous products of combustion are retained under a pressure exceeding that of the external atmosphere, as in the high-pressure furnaces described in the patent granted to me in England, and bearing date the 10th day of November, 1868, and numbered 3,419.

The improvements constituting my present invention consist: 1st, in certain modified forms of the reverberatory furnace, and in each and every of such modifications I employ an outer shell or casing constructed of plates of iron or steel securely riveted together, or of cast-iron secured by hoops, bolts, or ties of malleable iron or steel, the shell in either case being well calked and rendered air-tight at all laps and joints, and of sufficient strength to resist safely an internal pressure of one or more atmospheres in excess of the external atmospheric pressure, as set forth in the patent hereinbefore referred to. The lining of all such modified forms of furnaces may be made with fire-brick, plumbago, or ganister, or other refractory materials, and the tuyeres for conveying a blast of air therein may also be made in the manner set forth in the specification of my former patent before referred to.

Figure 1:
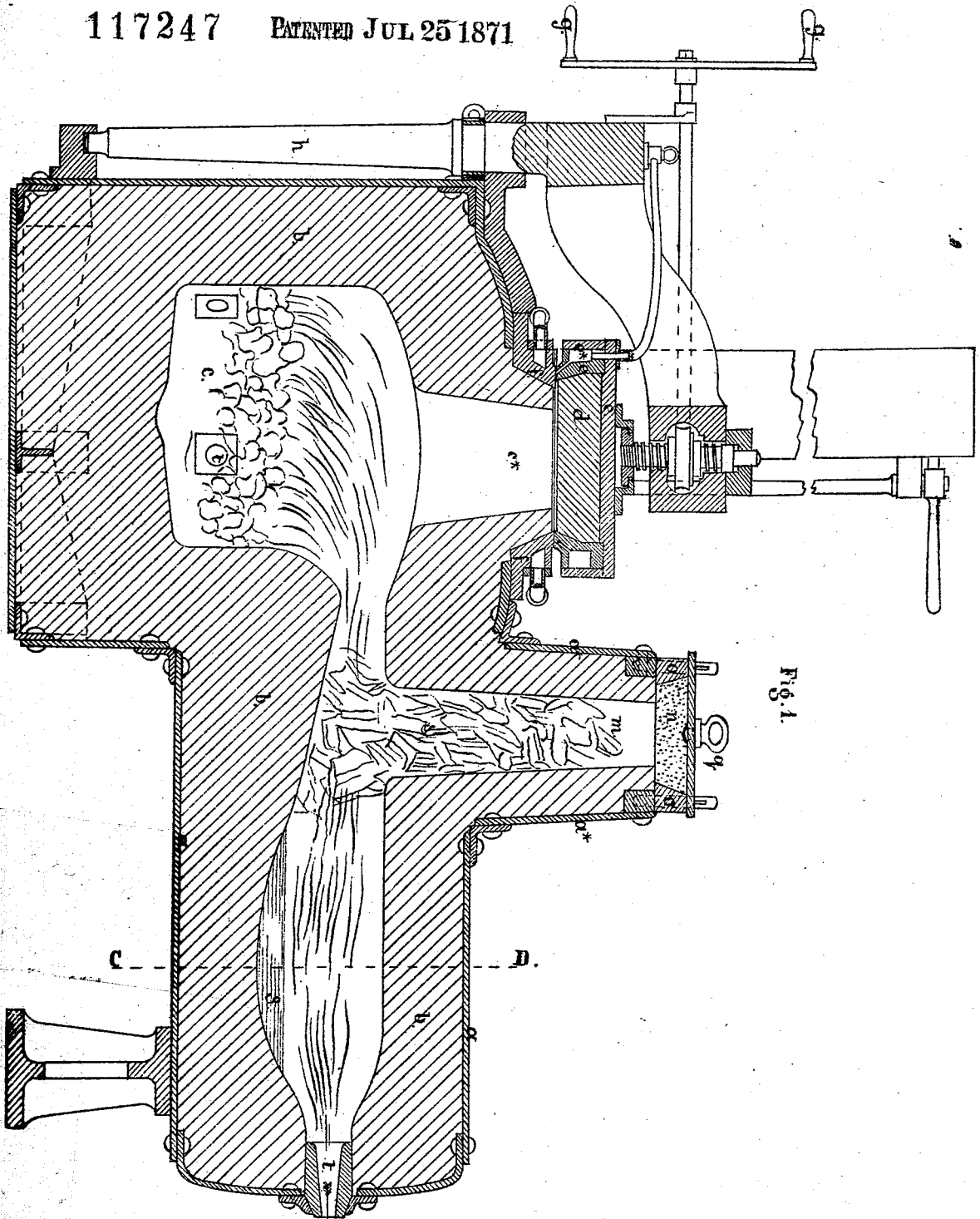
Figure 2:
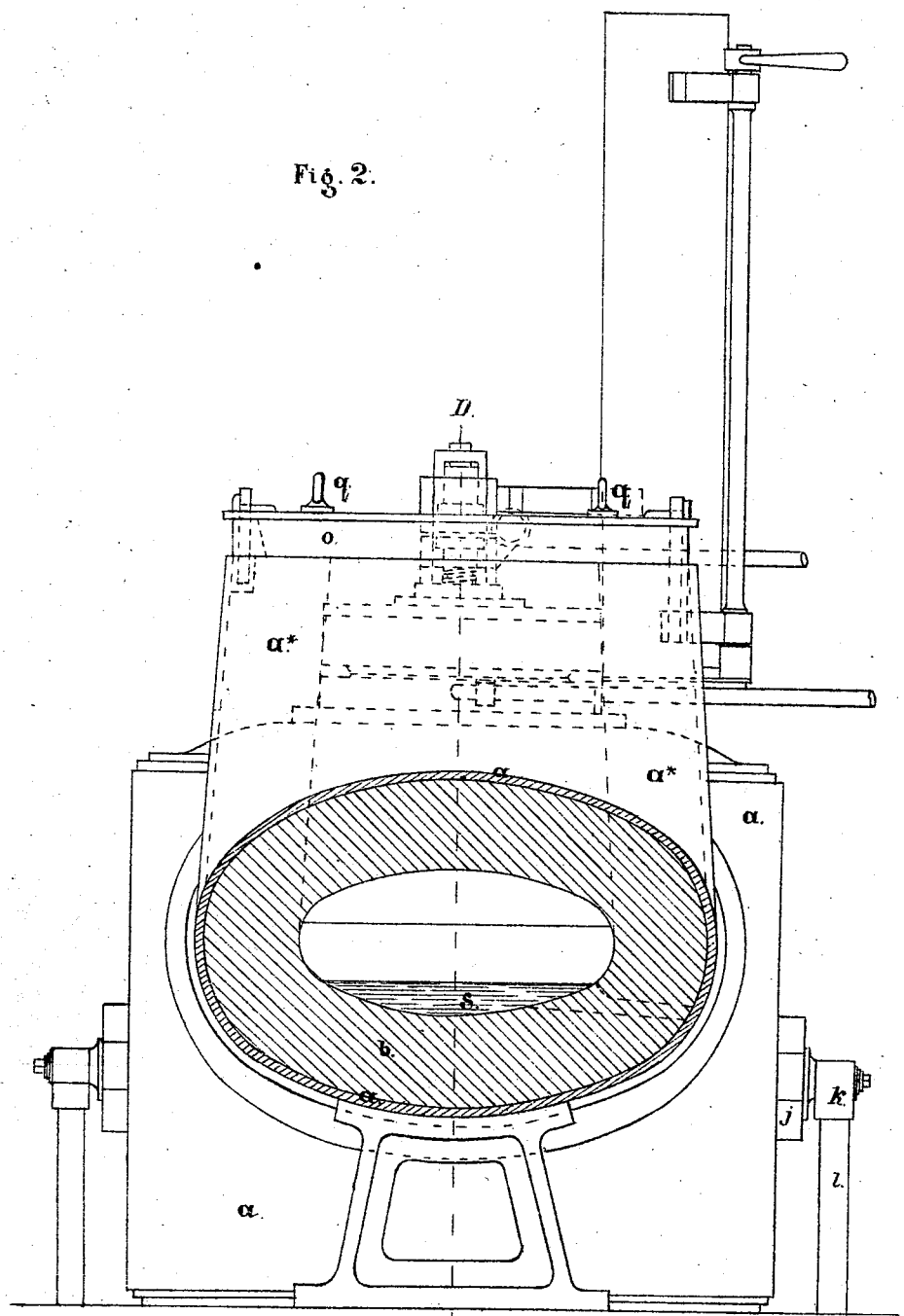
Figure 3:
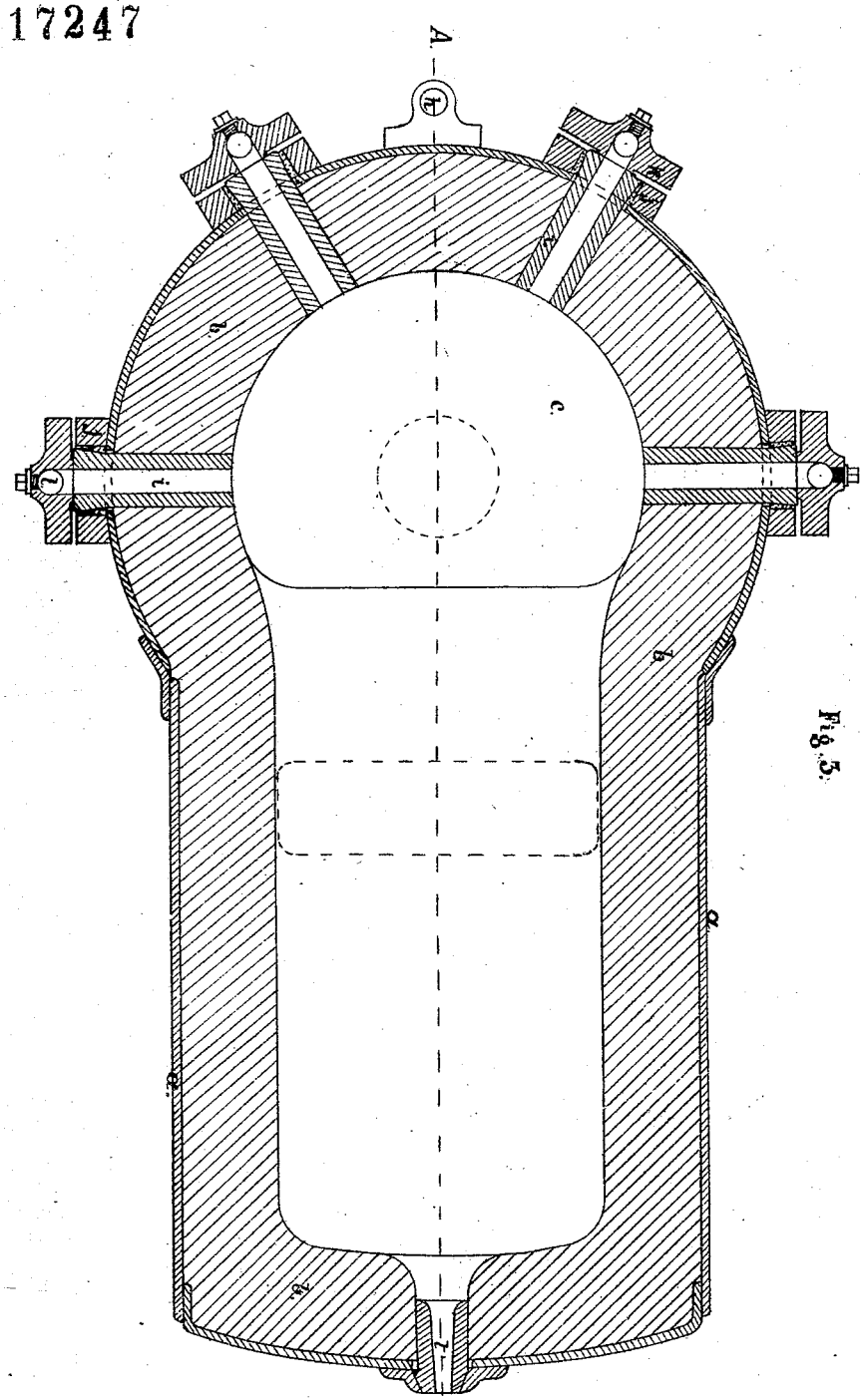

In one modification of the furnaces so constructed I form a feeding-chamber, for the supply of metal to be melted, of the whole or nearly the whole breadth of the hearth of the furnace, from which it rises vertically, near that part usually called the fire-bridge; I prefer it to be a rectangular chamber, sufficiently large to contain the whole or greater part of the charge of metal to be melted at one operation. It may be lined with brick-work or in a similar manner to the rest of the furnace, and at top may have a door through which the metal is put, and which is then closed by a simple metal fitting, which may be protected from the effects of heat by the leakage inward of air or steam, or the iron door, lined with fire-brick, may be luted with lime or clay-slip, and be secured against the internal pressure by cottered studs, or by bolts and nuts, or by any other suitable and convenient mode of fastening. The fire-chamber may be circular or D-shaped, the straight side of the D being next the hearth. I prefer to make a low roof to such furnace in order to keep the flame well down upon the metal in the hearth when melted. The escape-aperture being at the end of the furnace furthest from the fire-chamber, the flame and heated matters will have to pass through the interstices of the loose heap of scrap or other metal which descends from the feeding-chamber and intercepts the free passage of the flame to the exit-aperture. As the lower part of the mass fuses the remainder of the metal sinks down and takes its place until all is fused. And in order that the mode of constructing such furnaces may be fully understood, I have represented the same in Sheet A of the drawing hereunto annexed, where Figure 1 represents a vertical longitudinal section on the line A B of Fig. 3, and Fig. 2 a vertical cross-section on the line C D of Fig. 1; a horizontal section is also shown at Fig. 3; in all of which figures the same letters of reference are used to indicate a repetition of the parts shown. The outer shell *a* of the furnace is composed of stout plate-iron or steel, securely calked and riveted. *b* is the lining, of fire-brick, ganister, or other refractory material. The fire-chamber *c* may be of a circular form, having a groove or hollow across the lower part to facilitate the running out of the fluid slags produced by the fusion of the impurities of the fuel at a suitable tap-hole, not shown, such fusion being assisted by the use of lime, as in ordinary cupola-furnaces. The upper part of the fire-chamber has an opening at *c*\* for the admission of fuel. This opening is closed by a fire-tile, *d*, fitted to a metal ring or case, *e*, and is forced down upon the upper iron ring *f* of the furnaces by means of a compound-screw arrangement actuated by the handles *g;* the whole of which apparatus, at the time of putting on a fresh supply of fuel, is moved on one side on the axis or crane-post $h$; the cooling of the metal ring $f$ by the circulation of water, and the prevention of the escape of heated gases at the junction of the rings $e$ and $f$, being prevented by a blast of air conveyed into the annular passage $e^*$; the whole of the arrangements of the feeding-door, its screw apparatus, crane-post, feeding-cylinder, and circulation of air and water being precisely the same as described in a former patent granted to me in England, and bearing date the 10th day of November, 1868, and numbered 3,419, and, therefore, of itself forms no part of my present invention. The combination of coke or other fuel in the fire-chamber $c$ is kept up by forcing in a blast of air under considerable pressure at the tuyeres $i\ i$. These tuyeres are formed, by preference, of burned fire-clay, and are calked at their outer ends into the iron frames $j$, and are held in place by the cross-arms $k$, by which the blast-pipes $l$ are screwed up and held in close contact with the end of the tuyeres. $m$ is a vertical rectangular chamber, tapering from the top downward. It is covered by a fire-tile, $n$, let into an iron frame, $o$, and is held firmly in its place by cotter-bolts, which pass upward from the iron ring $p$, the latter being securely riveted to the outer casing $a^*$ of the rectangular chamber $m'$. Two loops, $q\ q$, are provided for lifting off the cover by a small crane or lever. When the furnace is well heated the frame or cover $o$ is removed and the charge of metal to be melted is introduced, as shown at $r$, the lower portion resting on the inclined shape of the furnace-hearth; the cover is put on and cottered down, a little clay or lime luting having been first smeared over the surfaces coming in contact; a powerful blast is then forced through the tuyere $i$ into the fire, the flame and heated gaseous products of combustion passing through the interstices of the scrap metal at $r$, and passing over the bath where the fused metal accumulates at $s$, and finally escapes at the small opening $t$, the size of this opening being such as to prevent the free escape of the gases, penning them back until the pressure within the furnace rises, by preference, from ten to thirty pounds per square inch in excess of the pressure of the external atmosphere, whereby the temperature of the products of combustion will be greatly increased, and the fusion of the malleable iron or steel readily effected, the mass sinking down and leaving the chamber $m$ as the fusion goes on until the whole is collected in a fluid state in the hearth $s$, into which some speigeleisen or other carburet of iron may be run; or either of these carburets of iron may be charged into the hearth at the time of commencing the melting operation. When the metal is at the most advantageous temperature for forming into ingots or castings it may be drawn off at a tap-hole, as usual in reverberatory furnaces.

In the second modification I omit the feeding-chamber, and in lieu thereof I make a feeding-door at the end furthest from the fire-chamber, using, by preference, a nearly flat shallow hearth. The scrap, wrought, or malleable-iron and steel, or other kind or quality of metal, I make into small piles on a board or tile, or on pieces of plate metal or crop ends of rails. I introduce these piles on a peel or shovel, commencing to pack them first near the fire-bridge in rows near each other until the whole charge is put in. I prefer that a space be left beneath the piles, which may be for that purpose propped up on wood, brick, or metal pieces, so as to allow the flame to pass under, between, and over the piles, well heating the hearth and the lower part of the piles before fusion takes place. The escape-apertures I prefer to make one on each side of the furnace, or to make one only at the top or roof, near the feeding-door, or in the feeding-door itself. This modification of the furnace is represented on Sheet B of the annexed drawing, where Figure 1 is a longitudinal vertical section on the line A B of Fig. 3. Fig. 2 is a vertical cross-section on the line C D of Fig. 1, and Fig. 3 a plan in section; in all of which figures the same letters of reference are employed to denote a repetition of the parts shown. $a\ a$ is the outer case or shell of the furnace, of stout plate-iron or steel, securely calked at all joints; $b$, the lining of fire-bricks, ganister, or other refractory material. The fire-chamber $c$ is made somewhat D-shaped, as shown in Fig. 3, the flattened side being formed by the fire-bridge $d$. The arrangements for the supply of fuel, including fire-door, screw apparatus, crane-arm, feeding-cylinder, and passages for escape of air and circulation of water, are similar to those described in reference to the furnace shown on Sheet A of the drawing annexed, the details of which arrangements are also more fully described in my former patent of the 10th day of November, 1868, and numbered 3,419, and hereinbefore referred to; but in lieu of employing the vertical feeding-chamber, as shown on Sheet A, I introduce the metal to be fused at the fire-door at the end of the furnace. This fire-door consists of a stout iron frame, $e$, dovetailed internally for the purpose of retaining in place the fire-tile $f$, which is molded with a central hole, $g$, forming the escape-opening for the compressed gaseous products of combustion. A plate, $h$, is riveted to the frame $e$, through which cotter-bolts pass for the purpose of securing the fire-door firmly onto the end of the furnace. The door so constructed may be removed by a small swing-crane, and when the workman has placed the piles of scrap or other metal $m$ evenly over the hearth the door is luted and cottered onto its seat; the blast is then applied until fusion is effected, as before described in reference to the furnace shown on Sheet A.

In the third modification of the reverberatory furnace I make the whole roof movable, so that by means of an overhead crane the metal shell of the furnace-roof and the lining of that part may be readily removed by loosening a series of cottered studs or bolts and nuts. This roof may be replaced by another while the former one is undergoing repair, the joint where the roof unites with the other portion of the furnace being rendered sound and air-tight by a mixture of three to six parts ganister to one of fire-clay, made into the consistency of mortar and evenly spread between the flanges. The bath and fire-chamber may, by the removal of the roof, be quickly cooled down and repaired. I prefer to line the roof and other parts of the furnace with a much less thickness of lining than is usual in reverberatory furnaces, and to cool the external shell of such furnaces by a close or open jacket through which water flows, for the lining (if made thin enough) to allow some of the heat absorbed by it to escape outward, and, in consequence, to prevent the lining rising to a destructive temperature. Thus by the loss of a little heat a much greater durability will be given to the furnace lining.

In either of the modifications of the reverberatory furnace before described the fire may be in a well or chamber with coke, a blast of air being introduced at several tuyeres. The furnace-door may also be closed in each case in the manner described in my former patent of the 10th of November, 1868, and hereinbefore referred to, in which case it is desirable to obtain a greater length of flame than can be obtained from the combustion of coke alone. I therefore, when not employing a liquid hydrocarbon for that purpose, prefer to employ pulverized coal in a fine granular state or completely reduced to fine powder. I introduce the coal into the blast-pipe by means of a small wheel having radial blades which fit accurately into a race or groove, the blades projecting into the blast-pipe so that the blast may carry forward the coal at the speed at which the wheel delivers it. I prefer to make the blast-pipe so small in diameter as to insure a powerful current between the feed-wheel and the tuyeres. The coal-powder may thus be forced in among the lumps of incandescent coke in any desired proportions, or the coal may be burned in a suitable chamber alone, as now practiced in other furnaces. This mode of feeding coal-powder into furnaces working under high pressure is represented in section at Fig. 5, Sheet D, of the drawing hereunto annexed, where P represents the main blast-pipe leading to the furnace in the direction indicated by arrows. On the upper side of the pipe a chamber is formed, in which the wheel Q is fitted, having an axis, R, which passes through the sides of the chamber T, and is there connected, by a strap or wheels, to any first mover. The chamber above the wheel Q may be enlarged upward so as to contain as much coal-powder as will be required during the fusion of a charge of metal. A close cover is screwed onto the chamber T, and a small pipe leading from the blast-pipe P enters the upper part of the chamber T for the purpose of equalizing the pressure of air above and below the wheel Q, which, in revolving, takes in as much powder between its radial blades as fills the cavity formed between them and the race in which it works. As the wheel revolves the spaces are filled with coal-powder, and on descending into the pipe P the blast carries the powder forward in a dense cloud along the pipe into the furnace, where the volatile parts are instantly converted into combustible gas, and, becoming ignited, produce a powerful flame. In lieu of this mode of burning coke and coal mixed, or coal alone in the form of powder, I construct the reverberatory furnaces after either of the modifications hereinbefore described, except in so far as the fire-chambers thereof are concerned, using in lieu thereof a fire-grate and ash-pit made after the manner of the fire-grates of ordinary reverberatory or puddling-furnaces, such fire-grate and ash-pit being arranged with a suitable door or slide so as to allow the ash-pit to be cleaned out when required, and be closed air-tight or sufficiently so for the purposes of my invention, and in which furnace I am enabled to burn the ordinary furnace-coal used in reverberatory furnaces. I also make a door or slide in order to gain ready access to the fire-bars so that the workman may remove the clinkers and adjust or remove a fire-bar, if necessary. When using a fire-grate I prefer to introduce the air for combustion in a diffused state through numerous openings into the ash-pit; and I also prefer to employ a chimney with an opening leading from the after part of the furnace into it in addition to the restricted opening through which alone the gaseous products of combustion pass while the furnace is working under a high pressure. With a furnace so arranged I am enabled to first heat the hearth and body of the furnace, and the piles of metal to be fused therein, by using the chimney-draught, the doors in the ash-pit being open so that the heated metal may be heated up to a welding-heat without a forced blast. The fire may then have fresh fuel put onto it, and all doors securely closed, and the blast applied, using, by preference, a very high pressure for a short time, so as to rapidly fuse the charge of heated metal and give it a high temperature. During the open-furnace heating there will be generally a tendency to oxidize the metal somewhat, so that by this mode of working a very mild metal may be obtained, or a proportionately large quantity of pig or other carburet of iron may be combined with it.

In reverberatory furnaces in which these improvements are used white or gray pig-iron may be melted on the hearth, (slowly, if desired,) or it may be supplied in a molten state to the furnace, and, in either case, be more or less decarbonized by the action of free oxygen passing over it along with the furnace-gases; the pressure may then be put on and the heat increased, and the scrap or other malleable metal forming part of the charge be fused and incorporated with the partially-decarbonized pig-iron so employed. A blast of air, to facilitate the decarburation of the metal, may be let in at the fire-bridge or at the feeding-door, and so, also, red ore or other oxidizing materials may be employed with the charge of pig metal to facilitate its decarburation. And, in order that the mode of constructing furnaces with a movable roof or arch, and capable, also, of burning coal and working with an ordinary chimney-draught at one stage of the melting process, and under great pressure at another stage, may be fully understood, I have shown on sheet C of the drawing hereunto annexed a furnace in which these several objects may be obtained, Fig. 1 being a longitudinal vertical section of the furnace and flue as arranged for working with a chimney-draught, and Fig. 2 shows the same when working under a pressure considerably above that of the external atmosphere, and Fig. 3 is a side elevation of the same. Fig. 4 is an end elevation, the chimney being removed in order that the arrangement of flues may be more clearly shown. Fig. 5 is a vertical cross-section on the line A B of Fig. 1, and Fig. 6 an elevation of that end of the furnace where the fire-chamber is situated. All letters on sheet C when repeated indicate a repetition of the same parts. $a$ is the outer shell of the furnace, formed in part of stout plate-iron or steel, riveted and calked, the cast-iron end plates $a^*$ being also firmly secured to the rest of the shell so as to prevent the escape of any heated gaseous matters at the joints. The furnace-lining $b$ is composed of fire-bricks, ganister, or other refractory materials usually employed in iron-melting furnaces. $c$ is a rectangular fire-chamber, the fuel resting on wrought-iron fire-bars $d$ supported on wrought-iron bearers $e$. The ends of these bearers pass through the flat sides of the shell $a$ at $e^*$, and serve as stay-rods to support them. An additional stay-rod, $f$, is also shown passing through the ash-pit $g$. The fire-bridge $b^*$ has a water-tube, $h$, passing through it to keep the brick-work from being overheated. The hearth $m$ of the furnace is nearly flat at bottom, sinking only as it approaches the tap-hole $n$. The movable roof or arch of the furnace $a^2$ is made of strong steel or iron plates, further stiffened by T-ribs $a^3$, the stout angle-frames $a^4$ forming a skew-back for the lining of bricks $b^2$, and serving also to secure the movable arch to the other portion of the furnace by means of the cottered studs $i$ $i$. These studs or bolts pass through the massive flange $a^5$, to which the lower portion of the furnace-shell is riveted, the ends of the movable roof or arch being secured in a similar manner, so that at any time when necessary the cotters $i$ can be withdrawn, and, by means of an overhead crane, the roof of the furnace may be removed and fresh lined, its removal also affording great facility for repairs of the fire-chamber and shallow hearth, which would otherwise be almost inaccessible. The junction of the movable roof with the other part of the furnace is rendered air-tight by a luting of fire-clay or lime. At $j$ the hearth of the furnace narrows, terminating at $j^*$ in a circular opening, through which the piles $k$ or other pieces of metal to be melted are introduced to the furnace. At this part the cast-iron end plate $a^*$ of the furnace is also circular in form, having a hollow channel, $r$, formed around it. Into this chamber air under pressure may be admitted by the pipe $l$ and cock $o$. The face of the channel nearest the flue is turned truly, and is perforated with numerous small holes $r^*$, as shown, for the purpose of conducting air into the channel formed on the sliding ring $s$, so that when the furnace is working under pressure the escape of compressed air between the surfaces of the ring $s$ and face-plate $a^*$ will prevent the passage outward of the heated gaseous products of combustion by reason of the pressure of the air conveyed by the pipe $l$ exceeding the pressure of such gases. In order to change the working of the furnace from the ordinary chimney-draught to high pressure I employ the double movable flues A and B, mounted on an axis, C, which is supported by brackets D bolted to the under side of the floor-plates E. The flues A and B are formed of riveted plate-iron, lined with segmental fire-bricks F. On one end of the flue-tube A is the flange $A^*$, and on the tube B a similar flange, $B^*$, both of which are for the purpose of forming a joint with the iron hoop G, which is fitted onto a wing of brick-work, H, projecting from the chimney $H^*$. At the opposite end of the flue-tubes are sliding rings $s$. One side of them is provided with a semicircular groove, as before named, and the opposite side is formed into a series of inclined surfaces. (See $s^*$, Fig. 3.) These inclined surfaces are fitted to similar ones formed on the edge of the hoops $u$, which are riveted on each of the flue-tubes A and B. By inserting a lever in the hole $v$ the ring $s$ may be moved round, and, by means of the inclined surfaces, will be forced in close contact with the face of the channel $r$. The flues A and B are mounted on an iron frame, $w$, through bosses in which the axis C passes. Between the lower ends of the frame $w$ a counter-weight, $y$, is fixed, for the purpose of balancing the double flue-tubes and admitting of their easy movement on their axes, the weight, by preference, being somewhat greater than the flues, in order to keep them in an erect position. $z$ is a pit below the floor-plates for the counter-weight $y$ to move in, slots being made in the plate E to allow the movement of the frame $w$. The length of the flue-tubes should be such as to afford ample space between the furnace and chimney for the workmen to stand when charging on the metal, when these tubes are moved on one side, as seen in Fig. 4, where the opening $j^*$ is shown uncovered, and readily accessible to the workman. As soon as the piles or other pieces of metal to be melted are introduced through the opening $j^*$ the workman will move the flue-tube A opposite the opening $j^*$, and tighten it up by turning round the ring $s$ with a lever, as described. This will bring the apparatus into the position shown in Fig. 1, and establish a free communication between the fire-chamber $c$ and the chimney $H^*$. The ash-pit $g$ is supplied with air through the open door L, moved by the handle M'. This door fits against a truly-surfaced face formed on the inside of the end plate $a^*$, so as to keep it air-tight when required. The fire is supplied with fuel through the opening $c^*$, which at other times is closed by a door, N, which slides horizontally by means of the handle O, shown in Fig. 6. The back part of the door fits accurately to the faced surface of the plate $a^*$. A fire-tile, N, shields the iron door from the too powerful action of the radiated part of the fire. The ashes may be removed at the end of the day's work by removing the plate P at the lower part of the ash-pit.

The action of the furnace will be as follows: The several movable parts referred to being in the position shown in Fig. 1, the workman will keep up the fire by ordinary chimney-draught, clearing his fire-bars from time to time through the open door L, and supplying coal or other fuel from time to time, as required, through the fire-door N and opening $c^*$. The very low roof of the furnace will keep the flame well down upon the metal, and, if arranged in piles mounted on the crop ends of rails, as shown, or on other pieces, the flame and heated matters will pass along the surface of the hearth, beneath the piles, and greatly raise its temperature, while the piles will be completely enveloped in the flame and be rapidly brought up to a welding-heat. As soon as this temperature is arrived at the workman will charge on a good supply of fuel and immediately proceed to close the door L, stopping all access of air to the ash-pit through this opening. He will then slacken the ring $s$ and push over the flue-tubes until he brings the tube B opposite the opening $j^*$. He will next tighten the joint by moving the ring $s$, and turn on air through the cock $o$ and channel $r$. The position of the several parts of the furnace then being as shown in Fig. 2, he will open a large sluice-valve, not shown in the drawing, whereby a blast of air under pressure (of twenty to fifty pounds per square inch, by preference) will pass up the pipe $q$ and through the numerous perforations shown, and will diffuse itself throughout the ash-pit and pass up through the fire-bars. The whole of the gaseous products in the interior of the furnace will be thus brought up to a pressure nearly equal to that of the blast, in consequence of the outlet to the chimney in the tube B being greatly diminished, as shown at R. This outlet is formed in a piece of well-burned fire-clay, $R^*$, and can be readily replaced when worn out. The opening R may be of about one square inch area for every square foot area of fire-grate, but this will depend on the pressure at which the furnace is to be worked. The gaseous products of combustion being thus prevented from expanding freely will retain in this dense form an extremely high temperature, which, acting on the previously highly-heated metal, will rapidly bring it to a state of fusion, after which it may be run off at the tap-hole $n$ and be mixed with molten speigeleisen, or other pig or carburet of iron, or alloy of iron may be put into the furnace and there fused and form part of the charge.

Another improvement in reverberatory and other furnaces working under high pressure consists in forming a second heating or melting-chamber, into which the flame and heated gaseous products of combustion from the furnace proper are allowed to flow, the second chamber being provided, by preference, with the restricted escape-aperture, the passage or opening leading from the furnace proper to the second chamber being large enough in that case to offer little obstruction to the passage of the gaseous products from one part to the other. Where, however, a much lower temperature in the second chamber is desirable, the aperture from the furnace proper should be much contracted and the escape from the second chamber left almost free. Such second chamber will be useful for melting speigeleisen to be added to the molten metal, and determine the state of carburation of the steel obtained by fusion in such furnaces; or the second chamber may be employed to heat scrap or other malleable metal to be afterward added to any partially-decarburized pig-iron in the hearth of the furnace proper. The second or heating-chamber to high-pressure melting-furnaces will vary in size and form, both with regard to the kind of furnace to which they may be applied and also to suit the purpose to which they may be required.

One of the forms or modifications of melting-furnaces which constitutes a part of my present improvements partakes of the cupola and reverberatory character of furnace combined in one—that is, the fire-chamber consists of an upright cylinder to which both the fuel and the malleable iron or steel to be melted are supplied, thus occupying one common chamber, as in the fixed cupola-furnace described in my former patent for high-pressure furnaces, dated the 10th day of November, 1868. The lower part of the furnace, instead of forming a receptacle for the fused metal, is slightly inclined to one side, and at the foot of this incline one or more openings are made leading direct into a shallow hearth covered by a low reverberatory arch or roof, the small exit-aperture for the escape of the gaseous products of combustion being at the end of the hearth furthest from the cupola part of the furnace. By this arrangement the metal as it fuses will flow down the inclined bed of the cupola and run into the hearth. The flame and heated products of combustion will also pass into this compartment of the furnace through the openings before named and heat the metal as it accumulates there. By this means the tendency of the molten metal to become too much carburized on the bed of the cupola will be prevented. In order to promote the combustion of the fuel in the upper part of the cupola a portion of the products of combustion may also be allowed to escape from the upper portion of it. And in order that this modification of the high-pressure melting-furnace may be fully understood, I have shown on Sheet D of the drawing hereunto annexed a longitudinal vertical section of the same at Fig. 1 and a cross-section at Fig. 2, taken at the line A B of Fig. 1, from which it will be seen that the upper part of the cylindrical fire-chamber $a$ is provided with a door and screw apparatus for closing it against the internal pressure arranged with cooling-passages and supply of air under pressure to the joint in precisely the same manner as hereinbefore described in reference to Figs. 1 and 2 on sheet A of the annexed drawing, and more fully described in a patent granted to me in England and bearing date the 10th day of November, 1868, and numbered 3,419, the shell $b$ of the furnace, the lining $c$, and the arrangements of the fire-clay tuyeres $h$ being also constructed in the manner described in the last-mentioned patent, and consequently of themselves form no part of my present invention, which in this case consists simply in combining the reverberatory roof $d$ and hearth $e$ with the cupola fire-chamber $a$, whereby the metal fused in the chamber $a$, instead of accumulating in the lower part of that chamber and being there exposed to the carburizing action of the incandescent fuel, runs down, as soon as it is melted, into the reverberatory hearth e, the heated products of combustion passing over it on their way to the escape-aperture f, which is so small as to pen back the gaseous products of combustion until a considerable pressure is obtained. A portion of these gases may be allowed to escape also by the small opening g near the top of the chamber a.

My invention also consists in certain other modifications of the high-pressure cupola-furnace employed for the fusion of malleable iron or steel. I make the furnace sufficiently high to contain the whole or greater part of the charge of fuel and metal which may be charged on at once, and the upper part of the furnace is then closed with a suitable door and fastened down until the complete fusion of the charge of metal is effected. I prefer to form a contracted part in such furnace, generally termed the boshes, at a small distance above the tuyeres, so as to prevent the charge of materials pressing in an unbroken column on the bottom of the furnace or on the molten metal contained there. In order to prevent an undue amount of carburation of the metal consequent on the height of the column of materials in the furnace, a small quantity of air or steam is allowed to flow through a suitable valve or opening into the upper part of the furnace, and find its way downward to the small escape-apertures which are situated below the boshes, and hence there will be no ascent of heated carbonic-oxide gas to act on and carburize the metal in the upper part of the furnace. The tuyeres which supply blast under high pressure, as well as the escape-aperture or apertures, are each below the boshes or contracted part. In some cases the tuyeres are at the lower level, and in other cases they may be at the higher level, and the escape-apertures only a little above the surface of the fluid metal when a full charge is collected in the hearth, suitable flues being provided to conduct the products of combustion away, the regulations of the pressure being effected by a restricted escape-aperture, as described in my former patent, dated November 10, 1868, hereinbefore referred to. In some cases I contract the interior casing of the furnace at the boshes, and I then make the escape-apertures open upward at this part. And in order that this mode of constructing high-pressure cupola melting-furnaces may be fully understood, I have shown a vertical section of one at Fig. 3 on sheet D of the annexed drawing, where a represents the riveted iron shell, lined with fire-brick or other refractory material; b, the opening. c is for the admission of fuel and the metal to be fused. A full charge is put on at once and the door or cover f is cottered down with a little lute in the joint to prevent escape of air. The blast to support combustion is supplied by the tuyeres g, which are arranged in the manner hereinbefore described and referred to. Below the contracted part or boshes the escape-apertures h are situated, so that the combustion of the fuel is for the most part or wholly confined to the lower portion of the furnace, the materials falling into the lower part of the furnace as the fusing of the metal and combustion of the fuel goes on, a small quantity of air or steam being admitted at the opening i to prevent the ascent of carbonic oxide among the pieces of unfused metal. By this mode of working a whole charge at once the labor and loss of time consequent on feeding in successive charges of metal and fuel are avoided.

For the better regulation of the pressure of the gaseous products of combustion in high-pressure melting-furnaces, I employ a mercurial gauge. The gases of the furnace have access to an iron pipe of about one inch in diameter, which is connected with the cistern containing the mercury which supplies the glass gauge, and in order to prevent the mercury becoming unduly heated I conduct, by means of a very small pipe and cock, a current of air from the main blast-pipe into the iron pipe first named, the jet entering it at about a foot above the level of the mercury. The air in the main blast-pipe will always be of a somewhat higher pressure than the gaseous matters in the furnace, so that a gentle current of cold air will constantly pass up the pipe first named into the furnace, and so prevent the flame and hot gases from ever descending into the mercury-cistern. The flow of air by the small pipe is too gentle to sensibly alter the mercurial column in the ordinary gas-tube. A mercurial gauge so constructed is shown at Fig. 4 on sheet D, where A is the mercury-cistern secured to the shell B of the furnace. C is a large iron pipe communicating with the interior of the furnace at C* at its upper end, and with the mercury-cistern at its lower end. E is the glass tube and F the scale of inches showing the amount of pressure in inches of mercury. A small pipe, H, leading from the main blast-pipe, enters one side of the pipe C above the mercury, and allows enough cold air under pressure to pass up the pipe C into the furnace to prevent the hot furnace gases descending to the mercury. The quantity of air admitted is so small, compared with the capacity of the pipe C, as not to sensibly alter the indicated pressure; but it nevertheless effectually protects the mercury from the intensely-heated gases of the furnace.

The state of the furnace and the operation going on in its interior may be seen by making one or more "eye-holes" of a conical form through the lining of the furnace, the outer end having a piece of stout glass forming a sort of eye-piece fitted to it and being also provided with a small pipe and cock, by which compressed air may enter in front of the eye-piece, and prevent, by its motion in an opposite direction, the passage of sparks or flame upon the conical aperture through which the sight is directed, thus keeping the glass cool and free from injury. The mode of constructing the peep-hole is shown at Fig. 6, sheet D, which represents a section of a portion of the shell and lining J of a high-pressure furnace taken through the center of the peep-hole. K is an iron ring with an annular passage, L, formed in it. Into this passage air is conducted by a small pipe from the main blast-pipe. Numerous small holes are drilled into this passage for the escape of air into the center part. A piece of blue glass, M, is held in place by the plate N. Through this glass the sight is directed, and also through the fire-clay cone O, which is bricked into the lining of the furnace. Through such an opening the fusion of the metal may be observed without difficulty from time to time as the operation proceeds, the current of air keeping the gases cool and preventing its being obscured by smoke or dust.

It has been found that the escape of a large body of flame and heated products of combustion from furnaces working under compression, as described in my former patent, dated the 10th of November, 1868, and before referred to, produces such a loud and continuous roar as to prevent the workmen attending to it from hearing any directions given to them when standing near the furnace while in blast. I have, however, found that this inconvenience is prevented or very much lessened by uniting a tube or flue to the mouth of the escape-aperture or to the parts adjacent, so that the escaping flame and gases are thereby cut off from immediate contact or communication with the surrounding atmosphere of the room or building in which the furnace is worked. For this purpose I employ an iron pipe lined with bricks, and form a crossbar therefrom either fixed or movable, so as to be readily connected or disconnected from the furnace. This lined pipe may either pass under ground or be directed at once upward through the roof of the building. I prefer to give the pipe a taper form, so as to allow the gases to expand gradually before their final exit into the atmosphere. In some cases it may be found desirable to form the restricted escape-aperture at the outer end of this pipe instead of forming it at a point immediately adjoining the furnace. The flue-tubes shown on sheet C of the annexed drawing for connecting the escape-aperture of the furnace with the chimney effectually check this unbearable noise, and, by their ready movement, admit free access to the escape-aperture when required.

I sometimes make the escape-orifices of high-pressure furnaces in a metal block or plate, having a water-passage formed in the metal around the orifice through which water is made rapidly to flow so as so keep the orifice cool. This mode of constructing the escape-openings of high-pressure furnaces is shown at Fig. 7, on sheet D, where $r$ represents a portion of the furnace-plate and lining $s$. A wrought-iron or cast-steel plate, $t$, is bolted to the plate $r$, and is formed with an annular passage, $u$, for the circulation of cold water supplied by the pipe $v$ and carried off by the pipe $w$. The metal escape-hole is preferable, being less likely to alter in size than fire-clay outlets.

Having thus described my invention, and the manner in which the several parts thereof may be carried into practical operation, I desire it to be understood that I do not confine myself to the precise details given so long as the peculiar character thereof be retained; but

I claim as my invention of improvements in the manufacture of malleable iron and steel, and in furnaces and apparatus employed for their fusion and treatment—

1. The employment of a vertical feeding-chamber for supplying scrap or other decarburized or uncarburized malleable iron or steel to reverberatory furnaces, where its fusion takes place under pressure of confined gaseous matters.

2. The arranging piles of scrap or other malleable iron or steel raised on supports on the hearths of reverberatory furnaces, in which the fusion of the metal is effected under high pressure of gaseous matters confined therein, and the forming such furnaces with a feeding-door at their ends to facilitate the introduction of such piles.

3. The constructing reverberatory high-pressure furnaces employed for the fusion of scrap or other decarburized or uncarburized malleable iron or steel with a movable roof or arch.

4. The cooling the outer shell or iron casing of reverberatory high-pressure furnaces employed for the fusion of scrap or other decarburized or uncarburized malleable iron or steel by water circulating in contact therewith.

5. The construction and employment of reverberatory furnaces for the fusion of scrap or other decarburized or uncarburized malleable iron or steel in such manner as to admit of fuel being burned on fire-bars by ordinary chimney-draught at the commencement of the process, and also to admit of the fuel being burned under a high pressure of confined gaseous matters toward the close of the fusing operation.

6. The employment of a movable double flue for changing the draught and opening the feed-hole of furnaces employed for the fusion of scrap or other decarburized or uncarburized malleable iron or steel, for the purpose of obtaining ingots or other masses of malleable iron or steel.

7. The decarburation or partial decarburation of molten pig or other carburet of iron on the hearths of reverberatory furnaces, and the subsequent fusion of scrap or other decarburized or uncarburized malleable iron or steel therein under the pressure of confined gaseous matters, for the purpose of obtaining malleable iron or steel by their fusion.

8. The general arrangement and combination of the several parts constituting the improved melting-furnace represented on sheet C of the annexed drawing.

9. The employment of the combined cupola and reverberatory furnace, constructed as shown at Figs. 1 and 2 on sheet D, and working under pressure of confined gaseous matters, for the purposes and in the manner described.

10. The employment of cupola-furnaces constructed as shown at Fig. 3, sheet D, such furnaces working under pressure of confined gaseous matter, for the purposes and in the manner described.

11. The means shown of protecting the mercury employed in gauges to indicate the pressure of gaseous matters in furnaces employed for the purposes described.

12. The constructing the peep-holes of high-pressure furnaces in the manner described.

13. The inclosing the orifices by which the products of combustion escape from furnaces used in the manufacture of malleable iron and steel, and working under high pressure in suitable tubes or passages to lessen the noise produced by the escape.

14. The forming the escape-apertures of high-pressure furnaces used in the manufacture of malleable iron and steel in metal, having water-passages formed therein to prevent their rapid destruction by heat.

HENRY BESSEMER.

Witnesses:
G. F. WARREN,
THOS. BROWN,
Both of No. 17 *Gracechurch street, London.*